US005743545A

United States Patent [19]

Kunze et al.

[11] Patent Number: 5,743,545

[45] Date of Patent: Apr. 28, 1998

[54] WHEELCHAIR WITH ADJUSTABLE FRAME

[75] Inventors: Karl-Heinz Kunze, Kiel; Peter Mackert, Lammershagen, both of Germany

[73] Assignee: Orthopedia GmbH, Kiel, Germany

[21] Appl. No.: 525,376

[22] Filed: Sep. 7, 1995

[30] Foreign Application Priority Data

Sep. 13, 1994 [EP] European Pat. Off. .............. 94114370

[51] Int. Cl.[6] ....................................................... B62M 1/14

[52] U.S. Cl. ........................ 280/250.1; 280/287; 280/638

[58] Field of Search ................................ 280/250.1, 647, 280/287, 281.1; 297/DIG. 4, 638, 657

[56] References Cited

U.S. PATENT DOCUMENTS

| | | | |
|---|---|---|---|
| 4,405,142 | 9/1983 | Whetstine | 280/250.1 |
| 4,679,816 | 7/1987 | Riikonen | 280/250.1 X |
| 4,805,931 | 2/1989 | Slasor | 280/647 X |
| 4,989,890 | 2/1991 | Lockard et al. | 280/304.1 X |
| 5,020,816 | 6/1991 | Mulholland | 280/250.1 |
| 5,253,888 | 10/1993 | Friedrich | 280/250.1 |
| 5,284,350 | 2/1994 | Geiger et al. | 280/250.1 |
| 5,409,247 | 4/1995 | Robertson et al. | 280/250.1 |
| 5,480,179 | 1/1996 | Peacock | 280/250.1 X |
| 5,620,196 | 4/1997 | Belik | 280/281.1 |

FOREIGN PATENT DOCUMENTS

| | | | |
|---|---|---|---|
| 0 312 969 A2 | 4/1989 | European Pat. Off. . | |
| 1475662 | 4/1989 | U.S.S.R. | 280/250.1 |
| 94/11236 | 5/1994 | WIPO | 280/250.1 |

*Primary Examiner*—Victor E. Johnson
*Attorney, Agent, or Firm*—Breiner & Breiner

[57] ABSTRACT

A wheelchair with two facing, interconnected, adjustable sideframes having fit thereto a seat, backrest, driving wheels and guide wheels is described. The wheelchair is characterized in that each sideframe has two rigid frame parts, which are adjustably interconnected in the longitudinal direction of the wheelchair by elongated frame sections. On one rigid frame part of each sideframe can be fit one of the driving wheels and on the other rigid frame part of each sideframe one of the guide wheels. The wheelchair frame is readily longitudinally adjustable. Simultaneously with the adjustment of the seat position, there is an adjustment of the wheels so that an optimum weight distribution over the wheelchair wheels is maintained. The frame has an extremely high rigidity.

23 Claims, 3 Drawing Sheets

WHEELCHAIR WITH ADJUSTABLE FRAME

FIELD OF INVENTION AND BACKGROUND OF THE INVENTION

The invention relates in general terms to wheelchairs having an adjustable frame, in particular wheelchairs having two facing, interconnected, adjustable sideframes; a seat; a backrest; and driving and castor or guide wheels affixed thereto.

In the case of wheelchairs, there is an increasing need for variable adjustment possibilities in order to adapt the seat position to the individual requirements of a particular wheelchair user. This not only relates to the settings of the seat position in the longitudinal direction, but also to the seat height and seat inclination relative to a wheelchair standing or base surface. However, an adjustable wheelchair must also at the same time have a high rigidity so that in all situations it can meet the safety needs of the wheelchair user. Finally, the often limited muscle power or strength of a wheelchair user and the frequent transportation of the wheelchair in other vehicles, makes it necessary for the wheelchair to have easy portability or disassemblability, limited stowing dimensions, and a limited weight. Finally, aesthetic standpoints must not be ignored in favor of functionality in the case of such a wheelchair.

A wheelchair having an adjustable frame is known from European Patent No. 312 969 B1. The frame of this known wheelchair has two sideframes connected by a folding device and to which are fitted a seat, backrest and driving, as well as castor or guide, wheels. The sideframes are formed in an angular and longitudinal adjustable manner by means of several profiled frame rod portions. The guide wheels are displacable in this construction longitudinally along a lower frame rod portion. Although in this known wheelchair numerous adjustment possibilities exist, the overall frame construction is relatively complex and difficult to adjust and also has limited rigidity. Moreover, in the case of this wheelchair, the adjustment possibilities for the wheels and armrests are greatly restricted. Finally, the visual appearance of this known wheelchair is unsatisfactory.

The present invention is directed to improving such a wheelchair so that the frame and the most important attachments have numerous adjustment possibilities which permit adaptation to the individual needs of a wheelchair user while also ensuring a high rigidity to the wheelchair.

BRIEF DESCRIPTION OF THE INVENTION

According to the invention, the above-described problems are solved by the provision of a preamble-basing wheelchair having sideframes which in each case have two rigid frame parts which are adjustably interconnected in the longitudinal direction of the wheelchair with elongated frame profiles or sections, wherein one rigid frame part can be fit in each case with one driving wheel and on the other rigid frame part in each case can be fit with one of the guide or castor wheels. As a result of the construction according to the invention, the wheelchair frame is longitudinally readily adjustable and, simultaneously with the adjustment of the seat position, there is an adjustment of the wheels so that optimum weight distribution over the wheelchair wheels is maintained. The frame has an extremely high rigidity.

For further improving the adjustment possibilities, particularly the adjustability of the vertical seat position and seat inclination, the driving wheels are preferably fittable in different positions in the longitudinal and/or vertical directions on the rear frame parts in the longitudinal direction of the wheelchair, and the guide wheels are displaceably fittable in the longitudinal and vertical directions by means of a mounting support along a sloping guide on the front rigid frame parts in the longitudinal direction of the wheelchair wherein the mounting supports have a vertical pivoting axis for the guiding movement and a horizontal pivoting axis so that the guide wheels can be pivoted for height setting purposes.

In addition, a portion for the pivotal fixing of the backrest can be provided on the rear rigid frame part and a recess for the pivotal fixing of a leg support can be provided frontally on at least one of the rigid frame parts carrying the guide wheels. Particularly as a result of the frontal mounting of the leg support on the front of the front rigid frame parts, the leg support can be pivoted both inwards and outwards or removed in a simple manner or replaced by another leg support. The pivotal articulation of the backrest to the rear rigid frame part, to which the driving wheels are also fitted, permits the displacement thereof at the same time as the displacement of the driving wheels.

In a preferred embodiment of the wheelchair according to the invention, the elongated frame sections are continuous cast sections and have several longitudinally extending hollow chambers, whereas the rigid frame parts are one-piece pressure die castings, preferably magnesium or aluminium pressure die castings or pieces molded by injection from suitable material. This construction permits an easy and, at the same time, rigid design with low manufacturing costs, while also allowing displaceable fitment to the continuous cast sections in a simple manner of additional subassemblies and components for the wheelchair.

Finally, it is possible to provide on the frame sections in a longitudinally displaceable manner mounting supports for armrests and brake mechanisms for each of the driving wheels.

Thus, these working groups of the wheelchair can be adapted in an easy manner to the particular seat or wheel positions in order to facilitate use.

In another preferred embodiment of the wheelchair according to the invention, a considerable part of the lateral faces of the wheelchair can be provided with a colored design through the detachable fitting of colored facing, cladding or covering parts or decorative elements. The colored cladding parts can be easily manufactured, for example, preferably as flat plastic parts or plates. As a result of the variable design, there is no need for different paint or varnish finishes of the main parts of the wheelchair. Storage of the cladding parts is much less expensive than storage of differently painted, completely fitted wheelchairs or the main subassemblies thereof. The final color choice or individual modifications to the design of the wheelchair can be easily and inexpensively carried out in the shop in a customer-specific manner or at any later time in accordance with a user's wishes.

Plug or clamp connections can be provided on the cladding parts by means of which the cladding parts can be detachably fit to parts or components of the wheelchair to be clad. The plug connections can be in the form of boss-like projections formed in or on the cladding parts and which are inserted into corresponding recesses or bores on the wheelchair parts or components.

According to a particularly preferred embodiment, the cladding parts are constructed as flat plates dimensioned in such a way that they can be fixed, for example, between longitudinal grooves provided on the frame sections by sliding or snapping since the plates can be slightly curved or arched upwards and consequently held securely in the grooves due to resiliency. Such a design is characterized by the particularly simple attachment or fitting of the cladding parts and by a cost-effective manufacturability of the cladding parts or decorative elements.

BRIEF DESCRIPTION OF THE DRAWINGS

Preferred embodiments of a wheelchair according to the invention are described in greater detail hereinafter in relation to the following attached drawings.

DETAILED DESCRIPTION OF THE PRESENTLY PREFERRED EMBODIMENTS

Figure 1:
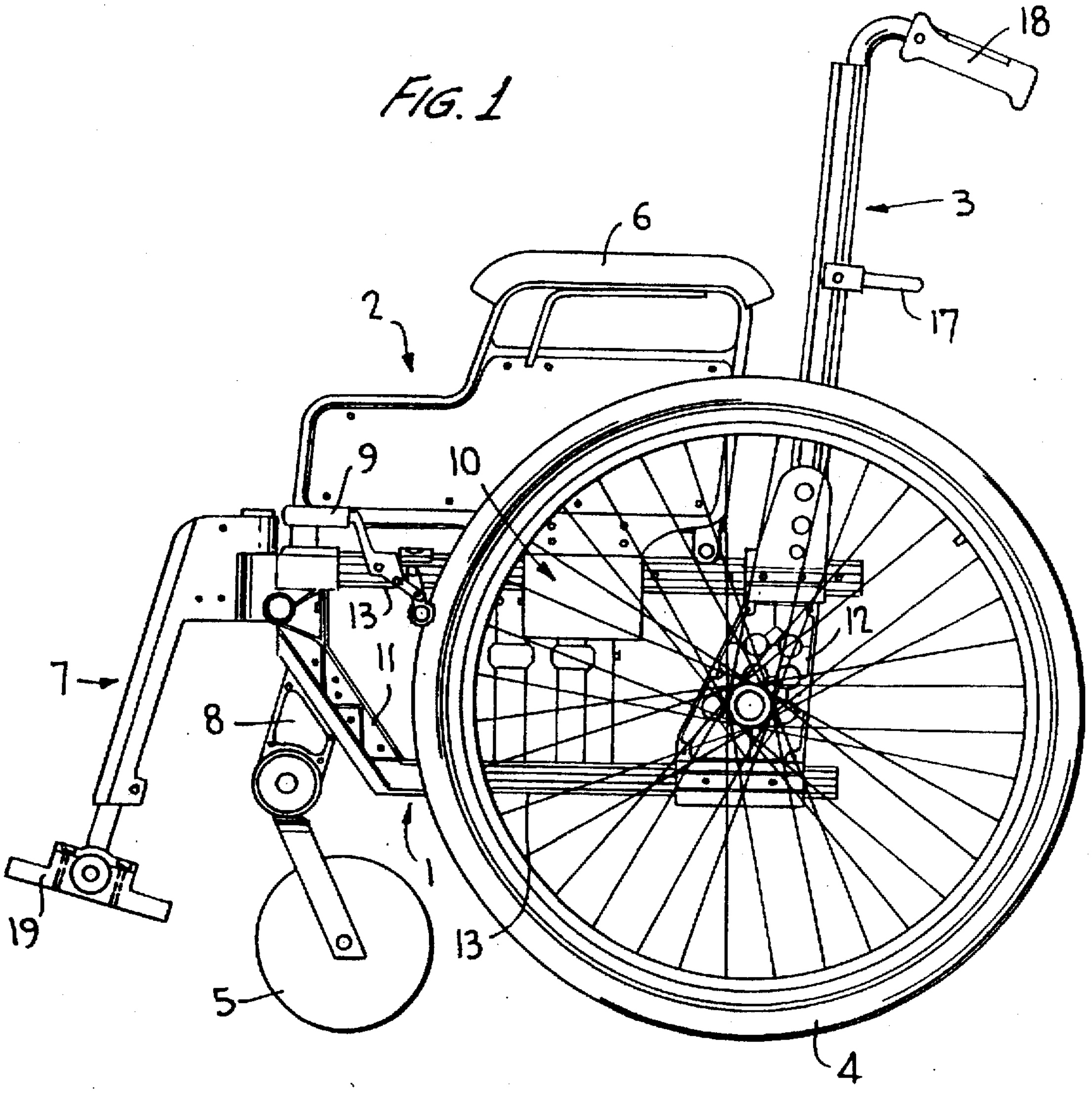
FIG. 1 is a partial side view of a wheelchair according to a preferred embodiment.
Figure 4:
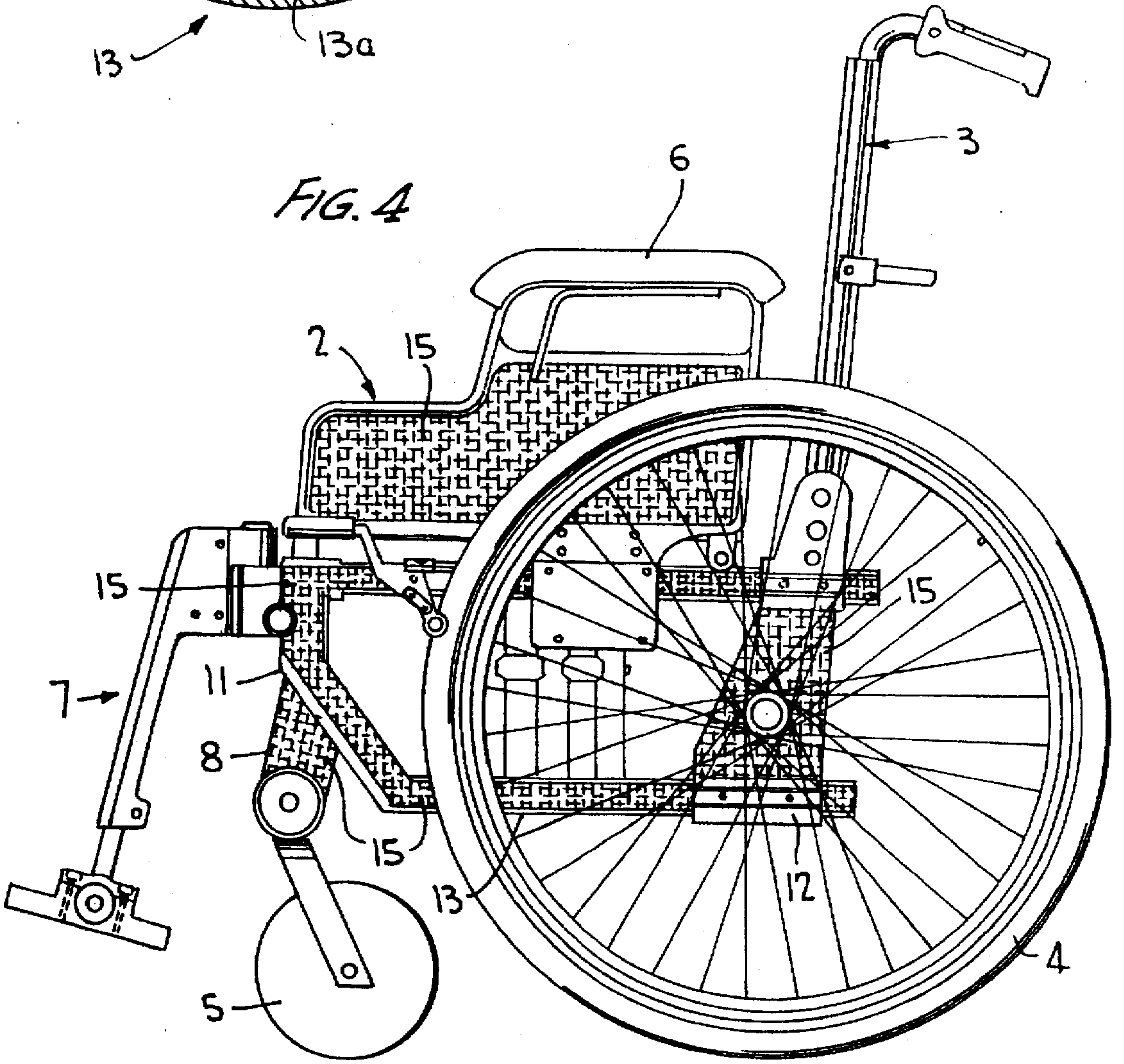
FIG. 4 is a side view of the wheelchair of FIG. 1 according to another embodiment having cladding parts fitted to the sideframe and attachments of the wheelchair.

FIGS. 1 and 4 show a wheelchair according to a preferred embodiment of the invention in side view. The wheelchair includes a frame comprising two facing, interconnected, adjustable sideframes 1, which are shown on a larger scale in FIG. 2. The sideframes are interconnected by conventionally known, and therefore not shown, folding mechanisms, in particular diagonal braces fixed to the insides of sideframes 1. For different seat widths, an individual diagonal brace can be provided in each case or a width-adjustable diagonal brace can be used for several seat widths.

To the sideframes 1 are fitted a seat 2, a backrest 3, driving wheels 4 and additional attachments such as arm rests 6, brake mechanisms 9, leg supports 7, and mounting supports 8 for guide, steering or castor wheels 5.

Each sideframe 1 comprises two rigid, front and rear frame parts 11 and 12, respectively, in the longitudinal direction of the wheelchair, as well as upper and lower elongated frame sections 13 which interconnect parts 11 and 12. The front rigid frame part 11 carries the front attachments, such as the pivotal leg supports 7 and the vertically adjustable mounting support 8 for the guide wheel 5, while the rear rigid frame part 12 has recesses 12*a* and 12*b* for the fixing of the backrest 3 or, on each side, one of the driving wheels 4.

On the end face of the front rigid frame part 11, a recess 14 is provided for the pivotal fitting of a leg support 7 with pivotal foot plate 19. Through the pivotal articulation on the end face, a pivoting movement of the leg support 7 in both the inward and outward directions is not restricted. Through a suitable configuration of recess 14, for example as a bore for a swivel pin on the leg support, it is possible to readily remove or replace the leg support, or, optionally, interchange one leg support with another model of leg support.

Figure 2:
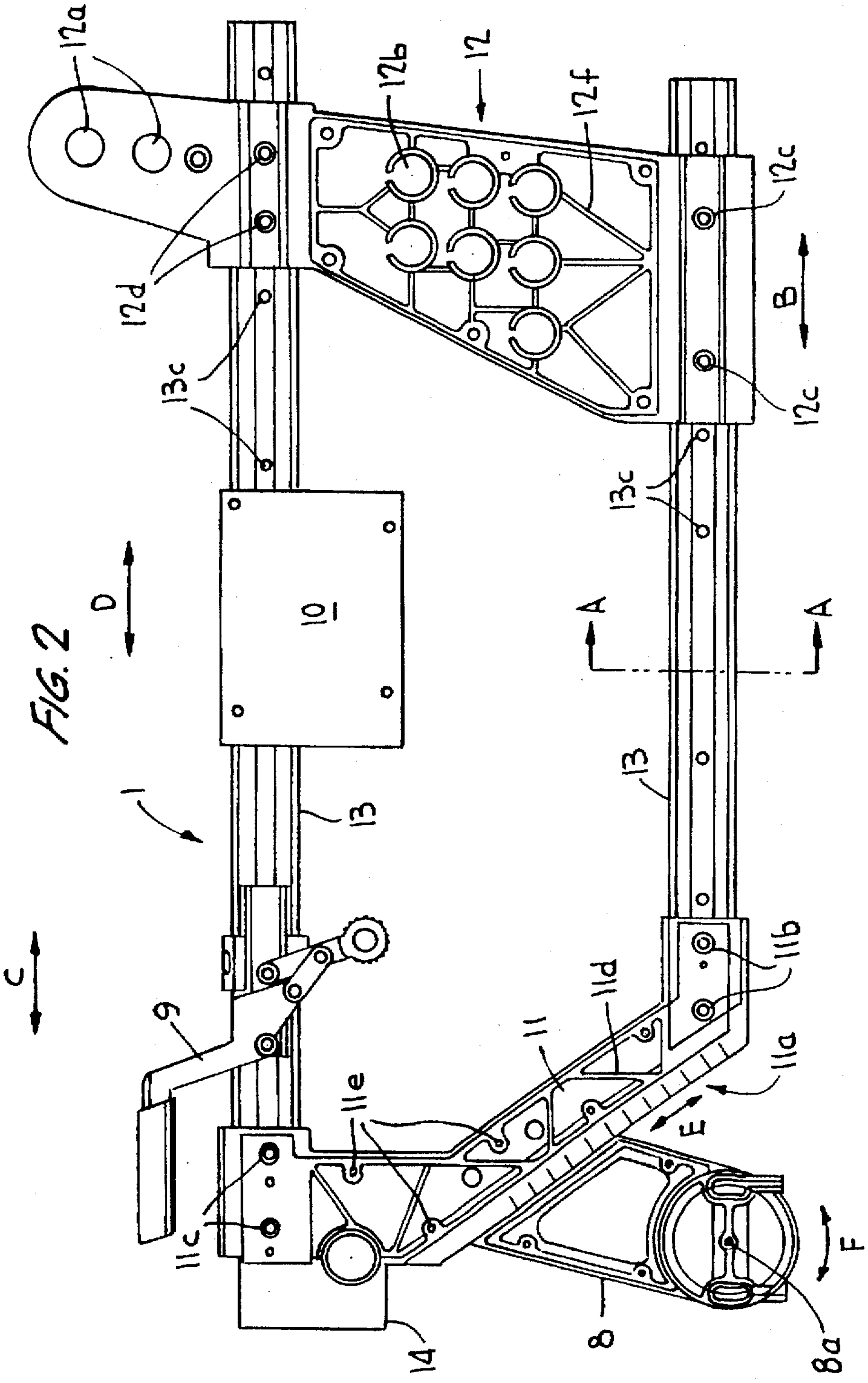
FIG. 2 is a side view of a sideframe of the wheelchair of FIG. 1.

The mounting support 8 for the guide wheel 5 is continuously adjustably fitted in the longitudinal and vertical direction of the sideframe on the front rigid frame part 11 along a sloping guide 11*a*, in accordance with arrow E in FIG. 2. The mounting support 8 is provided on its lower end with a bearing for the guide wheel 5 mounted on a side arm and has a vertical guide axle and a horizontal pivot pin 8*a* for the guide wheel which allows adjustment of wheel 5 not only about a vertical axis of the wheelchair during the guiding movement, but also as an angular adjustment about a horizontal axis. Preferably the axle bearing is implemented using a known castor bush. As a result of these adjustment possibilities for the guide wheel axle, there is no fixed dependence between the guide wheels and the driving wheels so that not only is it possible to set a wheel base or spacing between the guide and driving wheels, but also any desired seat inclination or a precise alignment of the seat face parallel to the standing or base surface of the wheelchair, independently of the particular horizontal or vertical position of the driving wheels.

Rear rigid frame part 12 has a plurality (seven in the embodiment shown) of vertically and horizontally spaced recesses 12*b* for fitting a driving wheel 4 in different positions. In the upper area of rear rigid frame part 12, there are also several recesses 12*a* for fitting the backrest 3 in different positions. The fitting of backrest 3 to recesses 12*a* can take place in a pivotal manner or a pivoting mechanism for the backrest 3 can be integrated into the latter. According to FIG. 1, the backrest 3 has a back stiffening strap 17, which is displaceably fixed in longitudinal grooves of the backrest 3 and consequently its vertical or height position is continuously adjustable. At the upper end of the backrest, there are vertically adjustable, bent down pushing grips 18.

Figure 3:
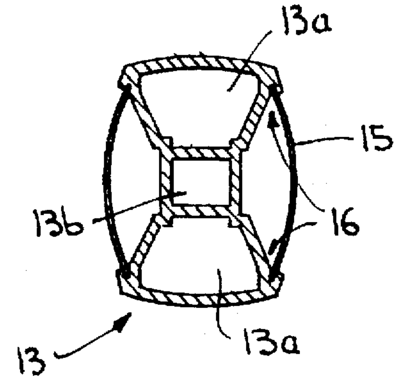
FIG. 3 is a sectional view along line A—A of the frame sections of the sideframe of FIG. 2.

The front and rear rigid frame parts 11 and 12 are preferably made as pressure guide castings, in particular magnesium or aluminium die castings. If necessary, the frame parts can have reinforcing ribs 11*d* or 12*f*. For fixing the elongated, lower and upper frame sections 13 to rigid frame parts 11 and 12, the latter have guides (not shown) for inserting the sections and bores 11*b*, 11*c*, 12*c* and 12*d*, which can be oriented or aligned with several bores 13*c* provided in elongated frame sections 13 for providing different longitudinal positions thereof and are connectable by suitable releasable connecting elements, such as screws or pins. In the preferred embodiment, the front rigid frame part 11 is firmly screwed to elongated frame sections 13, whereas the rear rigid frame part 12 is displaceable in the longitudinal direction of the elongated frame sections 13 for adjusting the seat and wheel position. This longitudinal displacement takes place in the direction of the arrow B in FIG. 2 and can be fixed in different longitudinal positions. The elongated frame sections 13 are preferably symmetrically profiled three chamber sections, more particularly as shown in FIG. 3, continuous cast sections with three chambers 13*a* and 13*b* for increasing the torsional rigidity.

On the upper elongated frame sections 13 of the sideframes 1 are, in each case, a brake mechanism 9 and an armrest receptacle 10 which are continuously displaceable in the direction of the arrows C and D in FIG. 2, i.e., the longitudinal direction of sections 13, and can be fixed in position by suitable means. In the armrest receptacle 10 can be fixed different armrest types, for example, with or without a clothing protection means or with its own vertical adjustment means. The longitudinal adjustment permits the adaptation of the armrest position to the particular seat position. As a result of the continuous longitudinal adjustability of the brake mechanism 9, the latter can be adapted to the driving wheel position so that in all fitting positions of the driving wheels 4, an adequate braking action is ensured.

In summary, as a result of the wheelchair design according to the invention, the following adjustment possibilities exist:

- seat height adjustment by vertical and/or lateral adjustment of the driving wheels with respect to the rear rigid frame part by changeover of the driving wheel axles in several fitting positions;

seat depth and seat position adjustment by displacing the rear rigid frame part with the attached driving wheel and backrest in the longitudinal direction of the wheelchair or sideframe;

modifying the wheel base or spacing and seat inclination or height by vertical and lateral adjustment of the guide wheels with respect to the front rigid frame part and re-adjusting the guide wheel axle angle; and adjusting the armrest and brake mechanism position by displacing the same in the longitudinal direction of the elongated frame sections.

Although the use of the elongated frame sections 13 and rigid frame parts 11 and 12 permits a visually attractive design in a simple manner, for example by a corresponding shaping and selection of the sections and the pressure die castings, according to a preferred development of the wheelchair of the invention as illustrated by FIG. 4, it is possible to provide cladding, covering or facing parts or decorative elements 15 for covering any of the lateral faces of the different parts or components of the sideframes or the wheelchair attachments. The cladding parts are preferably constructed as flat, colored plastic parts or plates, or as corresponding plastic moldings, which are fit by detachable connection and in a simple manner to the lateral faces of the parts or components to be covered. As a result of the construction as plastic plates or moldings, the cladding parts or decorative elements 15 can be easily and inexpensively manufactured, colored and worked. Optionally, it is also possible to use other materials such as, for example, sheets of various metals, wood, coated papers or cardboards, and the like, as well as other coating and design methods such as varnishing, painting, printing, anodizing, chromizing, and the like.

The design of the adjustable sideframes according to the invention permits a simple fitting of such cladding parts 15, in that, for example, in covering the front and rear rigid frame parts 11 and 12, recesses **11*e* or 12*e*** can be formed in the parts into which can be locked correspondingly shaped boss-like projections on the cladding parts. Alternatively, for fixing the cladding parts to the components, it is possible to use any suitable, detachable connecting method, such as screws, rivets, bonding, and the like, or suitably shaped plug or clamp connection means.

The lateral faces of the elongated frame sections 13 can be clad in a particularly simple manner in that strip-like cladding parts 15 are inserted or engaged between grooves 16 formed longitudinally on the upper and lower edges of the elongated frame sections 13. An adequate fixing of the cladding parts 15 is obtained in that the width of the cladding parts is provided somewhat greater than the spacing between the grooves 16. As a result of the outward convexity of the elastically shaped and resilient cladding parts, the latter are reliably held in position between the grooves. Alternatively, for fixing the cladding parts, other suitable detachable fixing means can be used. The snap fixing of the cladding parts in the grooves provided on the components to be clad can also be implemented by a corresponding shaping of the rigid frame parts.

In order to adapt to different longitudinal positions of the rigid frame parts and to the attachments fitted to the elongated frame sections, the cladding parts can be cut to an appropriate length for the interposed portions of the frame sections.

The preferred embodiment of the invention not only permits the above described universal setting possibilities for the wheelchair seat position, but also a simple, inexpensive and also subsequent modification of the color design of the wheelchair so as to meet the individual aesthetic desires of the wheelchair user.

As will be apparent to one skilled in the art, various modifications can be made within the scope of the aforesaid description. Such modifications being within the ability of one skilled in the art form a part of the present invention and are embraced by the appended claims.

It is claimed:

1. Wheelchair comprising two facing, interconnected, adjustable sideframes to which are fitted a seat and backrest, wherein each sideframe includes a front rigid frame part and a rear rigid frame part which are adjustably interconnected in a longitudinal direction of the wheelchair by two elongated frame sections, said two elongated frame sections being fit into corresponding guides on each of the front rigid frame part and the rear rigid frame part so that each rigid frame part in totality can be displaced in the longitudinal direction of said two elongated frame sections and can be fixed in different longitudinal positions along said two elongated frame sections, and wherein on the rear rigid frame part of each sideframe a driving wheel is fitted and on the front rigid frame part of each sideframe a guide wheel is fitted.

2. Wheelchair according to claim 1 wherein the two elongated frame sections have more than one longitudinally extending hollow chamber therein.

3. Wheelchair according to claim 1 or 2 wherein the front rigid frame part and the rear rigid frame part have recesses formed therein which can be aligned with and connected to recesses provided in the two elongated frame sections for setting different longitudinal positions for the front rigid frame part and the rear rigid frame part.

4. Wheelchair according to claim 1 wherein the respective driving wheel can be adjustably positioned on each rear rigid frame part of the sideframes, and wherein the respective guide wheel can be displaceably fit in longitudinal and vertical directions by means of a mounting support along a sloping guide on the front rigid frame part of each sideframe and the mounting support has a vertical pivot axis for engagement with the respective guide wheel and a horizontal pivot axis about which the respective guide wheel is pivotal for additional vertical adjustment.

5. Wheelchair according to claim 4, wherein the horizontal pivot axis is a castor bush.

6. Wheelchair according to claim 1 wherein the rear rigid frame part of each sideframe has a portion for pivotally fixing the backrest thereto.

7. Wheelchair according to claim 1 wherein on at least one of the front rigid frame parts of the sideframes is provided a recess for the pivotal fixing of a leg support.

8. Wheelchair according to claim 1 wherein a brake mechanism for each driving wheel is longitudinally displaceably fitted to one of the two elongated frame sections of each sideframe.

9. Wheelchair according to claim 1 wherein an armrest receptacle and an armrest fixed thereto are longitudinally displaceably fitted to one of the two elongated frame sections of each sideframe.

10. Wheelchair according to claim 1 wherein the front rigid frame part and the rear rigid frame part are each one-piece pressure die castings.

11. Wheelchair according to claim 10 wherein the die castings are magnesium pressure die castings.

12. Wheelchair according to claim 10 wherein the die castings are aluminium pressure die castings.

13. Wheelchair according to claim 1 wherein the elongated frame sections are each a continuous cast section.

14. Wheelchair according to claim 2 wherein the two sideframes are interconnected by a folding mechanism affixed to an inside of each of the two sideframes.

15. Wheelchair according to claim 14 wherein said folding mechanism is a diagonal brace.

16. Wheelchair according to claim 1 wherein affixing means are present in the wheelchair to permit attachment of detachable colored cladding parts to a predetermined part of the wheelchair so as to provide a variable color design to the wheelchair.

17. Wheelchair according to claim 1 further comprising detachably affixed colored cladding parts.

18. Wheelchair according to claim 16 or 17 wherein the cladding parts are fixable to a lateral face of each of the front rigid frame part, the rear rigid frame part and the elongated frame sections.

19. Wheelchair according to claim 18 wherein when the cladding parts are fixed to the elongated frame sections, a plurality of said cladding parts are used so as to adapt the cladding parts to different longitudinal positions along the elongated frame parts.

20. Wheelchair according to claim 18 wherein the cladding parts fixable to the elongated frame sections are dimensioned so that the cladding parts can be positioned in longitudinal grooves provided in the elongated frame sections.

21. Wheelchair according to claim 16 or 17 wherein the cladding parts have projections which can be locked in corresponding recesses present in a predetermined part of the wheelchair.

22. Wheelchair according to claim 16 or 17 wherein the cladding parts are flat parts made from a member of the group consisting of plastic, metal, wood, coated paper and coated cardboard.

23. Wheelchair according to claim 19 wherein the cladding parts fixable to the elongated frame sections are dimensioned so that the cladding parts can be positioned in longitudinal grooves provided in the elongated frame sections.

* * * * *